US011343108B2

(12) United States Patent
Booher et al.

(10) Patent No.: US 11,343,108 B2
(45) Date of Patent: May 24, 2022

(54) GENERATION OF COMPOSITE PRIVATE KEYS

(71) Applicant: Arizona Board of Regents on Behalf of Northern Arizona University, Flagstaff, AZ (US)

(72) Inventors: Dennis D Booher, Flagstaff, AZ (US); Bertrand F Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 140 days.

(21) Appl. No.: 16/900,671

(22) Filed: Jun. 12, 2020

(65) Prior Publication Data

US 2020/0396091 A1 Dec. 17, 2020

Related U.S. Application Data

(60) Provisional application No. 62/860,474, filed on Jun. 12, 2019.

(51) Int. Cl.
*G06F 11/30* (2006.01)
*G06F 12/14* (2006.01)
*H04L 9/32* (2006.01)
*H04L 9/06* (2006.01)
*H04L 9/30* (2006.01)

(52) U.S. Cl.
CPC .......... *H04L 9/3278* (2013.01); *H04L 9/0631* (2013.01); *H04L 9/304* (2013.01)

(58) Field of Classification Search
CPC ...... H04L 9/3278; H04L 9/0631; H04L 9/304
See application file for complete search history.

(56) References Cited

U.S. PATENT DOCUMENTS

| 5,434,917 A | 7/1995 | Naccache et al. |
| 8,300,450 B2 | 10/2012 | Christensen et al. |
| 10,320,573 B2 * | 6/2019 | Cambou ............... H04L 9/3278 |

(Continued)

FOREIGN PATENT DOCUMENTS

| WO | 2015105687 A1 | 7/2015 | |
| WO | WO-2019140218 A1 * | 7/2019 | ........... G06F 21/602 |

*Primary Examiner* — Phy Anh T Vu
(74) *Attorney, Agent, or Firm* — Quarles & Brady LLP

(57) ABSTRACT

A system and method for the generation of composite private keys are provided. First and second bitstreams are retrieved from an addressable cryptographic table by deriving addresses in the addressable cryptographic table from an initial instruction, accessing first and second bit values stored at addresses belonging to the derived addresses in the addressable cryptographic table, and outputting the first bit values as the first bitstream and the second bit values as the second bitstream. The first bitstream is concatenated with data from the first bitstream to form a data stream having a desired length and the second bitstream is concatenated with data from the second bitstream to form a selector stream having the desired length. A first composite encryption key having a length longer than the first and second bitstreams is formed by selecting values of the data stream identified by corresponding bit values of the selector stream.

20 Claims, 7 Drawing Sheets

(56) References Cited

U.S. PATENT DOCUMENTS

| | | | |
|---|---|---|---|
| 2003/0210783 A1* | 11/2003 | Filippi | H04L 9/14 380/44 |
| 2008/0044027 A1 | 2/2008 | Van Dijk | |
| 2011/0103161 A1* | 5/2011 | Tuyls | G11C 7/1006 365/189.16 |
| 2012/0128151 A1* | 5/2012 | Boehm | H04H 20/31 380/42 |
| 2012/0131340 A1* | 5/2012 | Teuwen | H04L 9/3273 713/168 |
| 2012/0183135 A1 | 7/2012 | Paral et al. | |
| 2012/0265928 A1 | 10/2012 | Mun et al. | |
| 2013/0156183 A1* | 6/2013 | Komano | H04L 9/0861 380/44 |
| 2014/0093074 A1* | 4/2014 | Gotze | G06F 21/73 380/45 |
| 2015/0007337 A1 | 1/2015 | Krutzik | |
| 2015/0071432 A1 | 3/2015 | Zhu et al. | |
| 2015/0195088 A1 | 7/2015 | Rostami et al. | |
| 2015/0234751 A1* | 8/2015 | Van Der Sluis | G06F 7/588 713/193 |
| 2016/0042628 A1 | 2/2016 | Roston | |
| 2016/0078252 A1* | 3/2016 | Chandra | G06F 21/79 713/190 |
| 2017/0017808 A1* | 1/2017 | Kwong | H04L 9/3278 |
| 2017/0046129 A1* | 2/2017 | Cambou | G06F 7/588 |
| 2018/0129801 A1* | 5/2018 | Cambou | G06F 21/44 |
| 2018/0145838 A1* | 5/2018 | Wang | H04L 9/3278 |
| 2018/0176012 A1* | 6/2018 | Hung | H04L 9/0866 |
| 2018/0278418 A1* | 9/2018 | Chang | H04L 9/0891 |
| 2018/0329962 A1* | 11/2018 | Schrijen | H04L 9/3278 |
| 2019/0165956 A1* | 5/2019 | Adham | H04L 9/0838 |
| 2019/0280858 A1* | 9/2019 | Cambou | H04L 9/006 |
| 2020/0382293 A1* | 12/2020 | Cambou | H04L 9/0861 |
| 2021/0281432 A1* | 9/2021 | Cambou | H04L 9/0866 |
| 2021/0399905 A1* | 12/2021 | Kwak | G06F 21/602 |

\* cited by examiner

| | |
|---|---|
| selByte = b0(p0(x0(selByte))) <= 1-selector pass | selByte = b0(p1(x0(selByte))) <= 1025-selector pass |
| selByte = b1(p0(x0(selByte))) <= 2-selector pass | selByte = b1(p1(x0(selByte))) <= 1026-selector pass |
| selByte = b2(p0(x0(selByte))) <= 3-selector pass | selByte = b2(p1(x0(selByte))) <= 1027-selector pass |
| ... | ... |
| selByte = b0(p0(x1(selByte))) <= 9-selector pass | selByte = b0(p1(x1(selByte))) <= 1033-selector pass |
| selByte = b1(p0(x1(selByte))) <= 10-selector pass | selByte = b1(p1(x1(selByte))) <= 1034-selector pass |
| selByte = b2(p0(x1(selByte))) <= 11-selector pass | selByte = b2(p1(x1(selByte))) <= 1035-selector pass |
| ... | ... |
| selByte = b0(p0(x2(selByte))) <= 17-selector pass | selByte = b0(p1(x2(selByte))) <= 1041-selector pass |
| selByte = b1(p0(x2(selByte))) <= 18-selector pass | selByte = b1(p1(x2(selByte))) <= 1042-selector pass |
| selByte = b1(p0(x2(selByte))) <= 19-selector pass | selByte = b1(p1(x2(selByte))) <= 1043-selector pass |
| ... | |

*FIG. 5*

|  | Composite key space |
|---|---|
| First ordered pair: key1 len1=21701 and key2 len2=21683 | |
| selector1 = concatenateX(key1, len2) | 448.7 MB |
| data1 = concatenateX(key2, len1) | 448.7 MB |
| Single Key Pair with one Selector pass-through only | |
| composite1 = generateComposite(selector1, data1) | 224.3 MB |
| composite2 = generateComposite(data1, selector1) | 224.3 MB |
| concatenate(composite1, composite2). | 448.7 MB |
| Single Key Pair with 50 * 8 * 128 Selector manipulations | |
| composite1 = generateCompositeManipulations(selector1, data1) | 10.9 TB |
| composite2 = generateCompositeManipulations(data1, selector1) | 10.9 TB |
| concatenate(composite1, composite2). | 21.9 TB |
| Ordered Key Pairs | |
| with 2 keys == 2 ordered key pairs | 22 TB |
| with 3 keys == 6 ordered key pairs | 65 TB |
| with 5 keys == 20 ordered key pairs | 219 TB |
| with 10 keys == 90 ordered key pairs | 986 TB |
| with 20 keys == 380 ordered key pairs | 4,163 TB |
| Key Extensions | |
| with unlimited key extensions | unlimited |

*FIG. 7*

GENERATION OF COMPOSITE PRIVATE KEYS

CROSS-REFERENCE TO RELATED APPLICATIONS

The present application claims priority to U.S. Provisional Application 62/860,474 entitled "Generation of Composite Private Keys" and filed on Jun. 12, 2019.

BACKGROUND OF THE INVENTION

Conventional secure communication techniques involve transmitting encrypted information over a channel such as an electrical transmission line, a fiber-optic cable, or through free space using electromagnetic waves. Such techniques make use of cryptographic methods utilizing shared secrets (i.e., a cryptographic key) between a sender and a receiver to ensure that only the intended parties can properly encode and decode a message. In some conventional approaches, the sender and receiver may share cryptographic tables or exchange information between them to arrive at a shared key. In such approaches the length of the shared keys used and the number of available keys will depend upon memory limitations and/or available communications bandwidth.

BRIEF SUMMARY

In an embodiment, a method includes receiving an initial instruction from a remote computing device using a client computing device having an addressable cryptographic table, retrieving first and second bitstreams having different lengths from the addressable cryptographic table by deriving addresses in the addressable cryptographic table from the initial instruction, accessing first and second bit values stored at addresses belonging to the derived addresses in the addressable cryptographic table, outputting the first bit values as the first bitstream and the second bit values as the second bitstream, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

In an embodiment, the method includes determining, as the different lengths of the first and second bitstream, two co-prime integers, and selecting a product of the different lengths as the desired length. In an embodiment, the method includes selecting a permutation instruction from a set of allowed permutation instructions defined in memory of the computing device, applying one or more permutation instructions or logical operations to the selector stream to produce additional selector streams, and forming additional composite encryption keys by selecting values of the data stream identified by corresponding values of respective additional selector strings. In an embodiment, applying the one or more permutation instructions or logical operations includes applying a unique permutation function that uniquely reorders values of the selector stream to produce each additional selector stream. In an embodiment, retrieving the first and second bitstreams from the addressable cryptographic table comprises measuring physical characteristics of physical unclonable function ("PUF") devices of a PUF array of the computing device at addresses in the PUF array derived from the initial instruction. In an embodiment, measuring the physical characteristics of the PUF devices of the PUF array comprises repeatedly measuring each PUF device and returning values for each PUF device based on statistical characteristics of the repeated measurements of that PUF device. In an embodiment, the method includes encoding into the first composite encryption key an error correction code, and executing an error correction method on the first composite encryption key using parity bits, data helpers, response based cryptographic methods, ternary cryptography, and fuzzy extractors.

In an embodiment, a device includes a processor and a memory coupled to the processor. The memory stores instructions that, when executed by the processor, cause the processor to perform the steps of receiving an initial instruction from a remote computing device using a client computing device having an addressable cryptographic table, retrieving first and second bitstreams having different lengths from the addressable cryptographic table by deriving addresses in the addressable cryptographic table from the initial instruction, accessing first and second bit values stored at addresses belonging to the derived addresses in the addressable cryptographic table, outputting the first bit values as the first bitstream and the second bit values as the second bitstream, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

In an embodiment, a device includes a processor and a memory coupled to the processor. The memory stores instructions that, when executed by the processor, cause the processor to perform the steps of receiving an initial instruction from a remote computing device, retrieving first and second bitstreams having different lengths from an addressable cryptographic table by determining first and second bit values stored at addresses belonging to addresses derived from the initial instruction in the addressable cryptographic table, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

FIG. 5 is table depicting combinations of data operations used to create multiple unique composite cryptographic keys.

FIG. 7 is a table summarizing composite key space sizes achieved using various combinations of key extension techniques disclosed herein.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Conventional encryption schemes using shared keys have disadvantages. In particular, the keys must be shared ahead of time and/or stored by both parties. It can be time consuming and resource-intensive to share and store large keys, particularly when it is desirable to use a larger number of keys (in polymorphic encryption schemes, for example). While known methods may be used to generate multiple longer keys from existing keys, the overall entropy of resulting encryption schemes may be reduced, compromising security.

Accordingly, the present disclosure describes systems and methods to generate numerous extended variable length cryptographic keys using shorter keys as inputs while preserving high levels of entropy. Private keys are generated using data in addressable cryptographic tables addressed using public keys. Extended length private keys may be derived from private keys such that the original private key space is obscured and new composite private keys do not repeat any patterns of the original private keys. One key is used as bit selector stream and the other key is used as a data stream to form the new composite private key. This invention extends the new composite private key space by the use of permutations and manipulations against the original bit selector stream. This results in no repetition across multiple composite private key spaces. Multiple composite keys can be produced from one data stream by applying permutations and other manipulations of the selector stream. Composite key generation performance may be optimized by using multiple ordered key pairs in parallel. This multi-threaded design improves the speed of key generation many times over by organizing the generation of composite keys around multiple key pairs in parallel. The composite key space is extended indefinitely by the use of key extensions as part of the encrypted payload. This has the impact of private key lengths that are as long as the data to be encrypted and decrypted.

Figure 1:
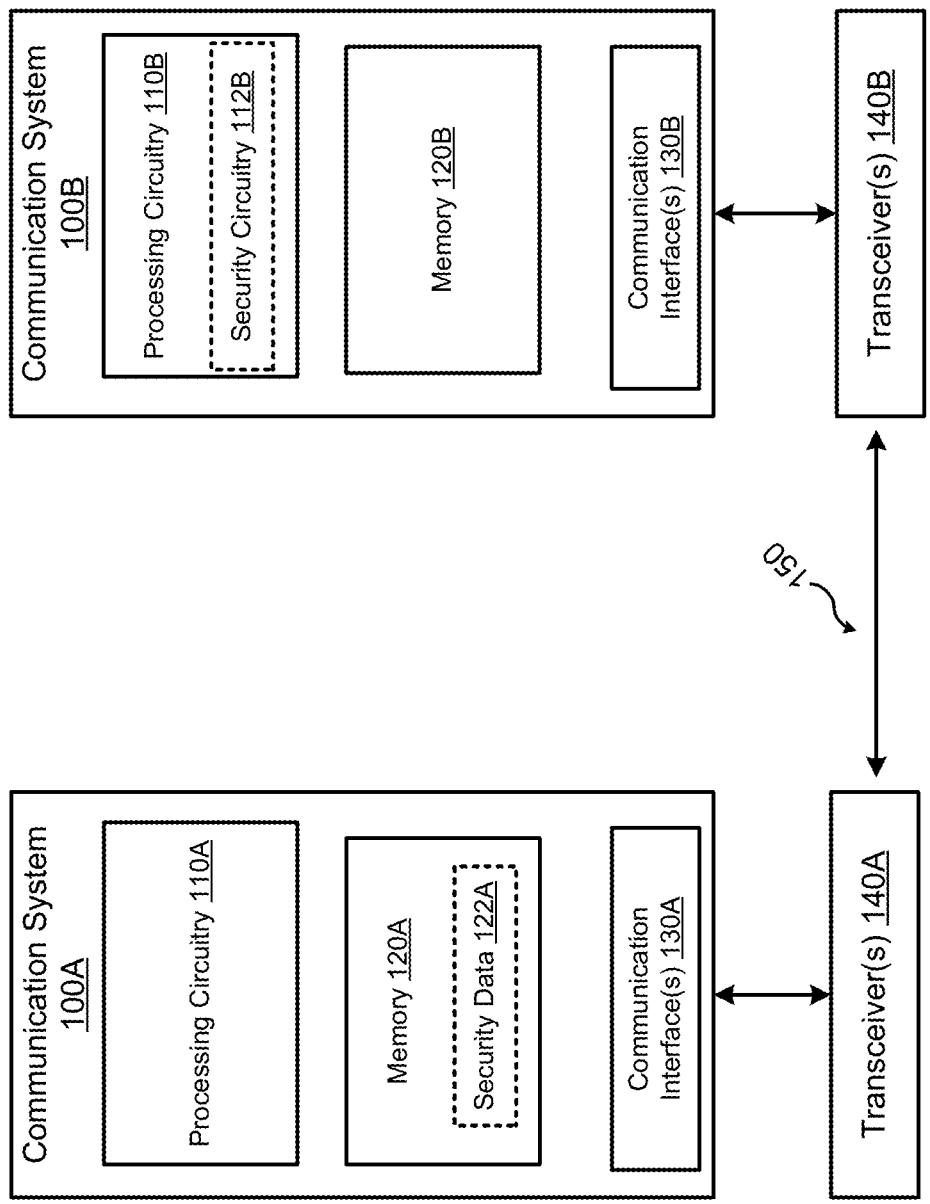
FIG. 1 depicts a schematic of example communication systems in which embodiments disclosed herein may be practiced.

FIG. 1 is a schematic illustrating communications systems in which embodiments disclosed herein may be practiced. In this example, communication system 100A acts as the sender ("Alice") and communication system 100B acts the receiver ("Bob"). The communication systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. The processing circuitry 110B of communication system 100B may optionally include security circuitry 112B, for use with certain embodiments disclosed herein. Similarly, the memory 120A of communication system 100A may optionally store security data 122A for use with certain embodiments.

In embodiments of the communication system 100B having the security circuitry 112B, the security circuitry 112B may include a dedicated PUF array. In such embodiments, the processing circuitry 110B may be configured to respond to an authentication challenge which specifies an address (or range of addresses) in the PUF array and a set of operations to perform in order to generate a unique response to the authentication challenge. Such embodiments may be designed to communicate with embodiments of communication system 100A configured to store security data 122A in the memory 120A. In such embodiments, the processing circuitry 110A is configured to generate authentication challenges and receive responses to those challenges. The responses and challenges may be saved as part of the security data 122A. In such embodiments the processing circuitry 110A may be further configured to send randomly-selected challenges to embodiments of communication system 100B having security circuitry 112B. In certain embodiments described herein, transmitting the challenges to communication system 100B allows communication systems 100A and 100B to agree upon the challenge responses as shared encryption keys without required information which might compromise the secrecy of those keys to be transmitted, as described below.

Figure 2:
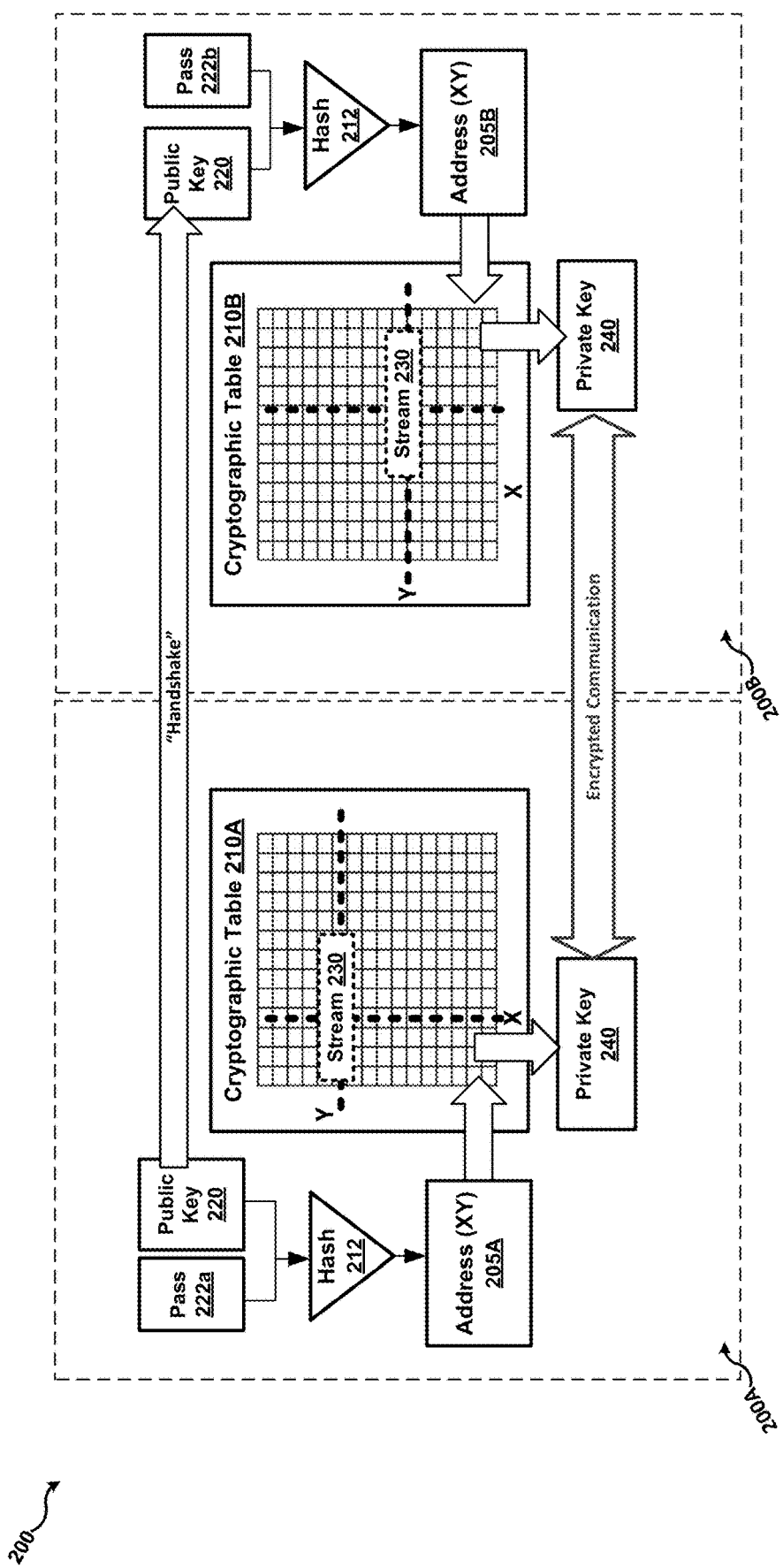
FIG. 2 depicts two communication systems communicating using a shared encryption key independently generated by both parties using cryptographic table data.

FIG. 2 illustrates an environment in which two parties, "Alice" (210A) and "Bob" (210B) communicate in order to agree upon a shared key. "Alice" and "Bob" each have access to respective cryptographic tables 210A,B. In embodiments such as the embodiment shown, the cryptographic tables store ternary data. "Alice" may generate a public key 220 (or a datastream from which the public key 220 may be extracted) and transmit that public key 220 to Bob. Alice and Bob can both use the public key 220 to access their respective cryptographic tables. In some embodiments, the public key 220 may be used to generate a message digest using a hash function 212. The output of the hash function 212 may be used as an address 205A,B (or range of addresses) that identifies a values stored in the respective cryptographic tables 210A,B. For added security the public key 220 may be combined with a password (such as one or both of the passwords 222A,B) or other token. The password may be shared by the two parties, or each party may use a unique password. In embodiments where each party uses a unique password, the address spaces of each of the cryptographic tables 210A,B may be configured such that the combination of the same public key 220 with the password of each party indexes the same data.

In some embodiments, the functionality of the cryptographic tables 210A,B may be realized by one party (e.g., "Bob") having an array of physical unclonable function (PUF) devices (a "PUF array") and another party (e.g., "Alice) having access to information characterizing the PUF array. For purposes of this disclosure, a PUF array may be any array of devices having unique physical characteristics which may be used to identify a user or device in possession of the array. In practice, unique PUF arrays may be produced using known semiconductor or other mass production techniques with sufficient variability such that it is highly improbable that any two arrays produced using the same process will possess indistinguishable physical characteristics. Non-limiting examples of such characteristics are time delays of transistor-based ring oscillators and transistor threshold voltages. Other non-limiting examples include optical devices. For example, Bob may possess an optical PUF device which, when illuminated by a light source such as a laser produces a unique image due to minute manufacturing variations. This image may be digitized and the pixels may be used to form an addressable PUF array. Another example is an array of SRAM cells each of which will "default" to storing a '0' or a '1'.

The measured characteristics of a PUF array (or a subset of devices in a PUF array) may not be perfectly deterministic to due to aging, thermal drift, or other causes. For example, some of the SRAM cells in an SRAM-based array may always store a '0' or '1' after a power cycle while others may oscillate between states. Non-deterministic devices may be dealt with in a number of ways. As one example, a system may repeatedly measure each device either before or in response to an attempt to read values of the devices. Devices whose measurements vary more than a threshold may be excluded and the system may store (or receive) instruction for substituting measurements of other devices in place of the "unreliable" devices. In other schemes, PUF devices may be measured repeatedly and assigned values based on statistical characteristics. For instance, devices that store a '0' more than a certain percentage of the time may be assigned a '0' value and devices that store '1' more than a certain percentage of the time may be assigned a '1' value. In some schemes devices that store a '0' or '1' may be assigned a third value as part of a ternary scheme in which reliable devices are assigned a '0' or a '1' while "unreliable" devices are assigned a third value. This concept may be extended to quaternary and other number systems. In some schemes, a device having a PUF array with potentially unreliable devices may store or otherwise receive error correction information such as parity and/or checksum data and may employ suitable error-correcting codes and other error-correction techniques. In an embodiment, error correction methods may be performed on the composite encryption key using parity bits, data helpers, response based cryptographic methods, ternary cryptography, and fuzzy extractors.

Figure 3:
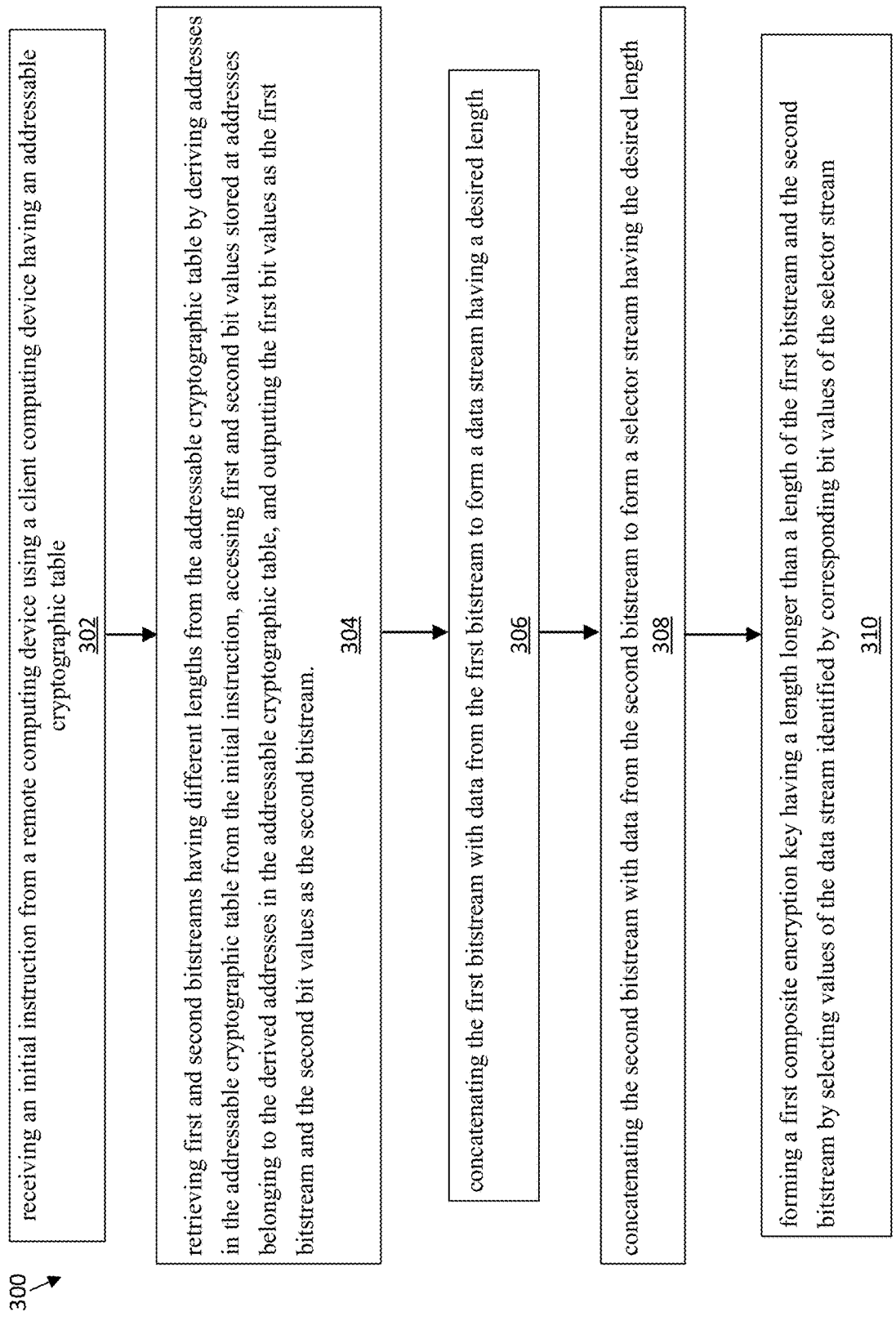
FIG. 3 is a flowchart depicting an example method for generating extended-length cryptographic keys according to embodiments disclosed herein.

As above, it may be desirable in certain applications to generate very long encryption keys and/or to generate multiple encryption keys for use with polymorphic encryption schemes. However, the length of each encryption key 240 and the number of possible unique encryption keys 240 is limited by the sizes of the cryptographic tables 210A,B. While longer keys can be generating by exchanging multiple public keys this may be bandwidth intensive and introduce unacceptable latency. FIG. 3 is a flowchart illustrated an example process 300 for generating one or more extended length keys according to embodiments herein. Two communicating parties may use a process such as the process 300 to independent generated one or more variable-length extended keys upon sharing a message (e.g., the public key 220) between them.

FIG. 3 is a flowchart depicting an example method 300 for generating extended-length cryptographic keys according to embodiments disclosed herein. Method 300 may be implemented by any suitable devices including appropriate combinations of processors, memory and other hardware components (e.g., PUF arrays). In an initial step 302, an initial instruction is received from a remote computing device using a client computing device having an addressable cryptographic table and in step 304 first and second bitstreams having different lengths are retrieved from the addressable cryptographic table by deriving addresses in the addressable cryptographic table from the initial instruction, accessing first and second bit values stored at addresses belonging to the derived addresses in the addressable cryptographic table, and outputting the first bit values as the first bitstream and the second bit values as the second bitstream. In step 306, the first bitstream is concatenated with data from the first bitstream to form a data stream having a desired length and in step 308 the second bitstream is concatenated with data from the second bitstream to form a selector stream having the desired length. In step 310 a first composite encryption key having a length longer than a length of the first bitstream and the second bitstream is formed by selecting values of the data stream identified by corresponding bit values of the selector stream. Below, details of key-generation processes related to the example process 300 are described further.

As an example, a composite key generation method begins with two private keys that are on average 21.3 KB long. These private keys are unique and are generated using two unique public keys (e.g., two public keys 220) to retrieve values from a cryptographic table (e.g., a cryptographic table 210). In general, the composite key generation process requires the steps comprising: At a minimum, two or more unique private keys, denoted as $K_1, K_2, \ldots, K_N$, with respective lengths of $L_1, L_2, \ldots, L_N$ bytes are selected. Each of the private keys must have different lengths wherein $L_1 \neq L_2 \neq \ldots \neq L_N$ and a greatest common denominator $\gcd(L_1, L_2, \ldots, L_N)=1$. Because each of the private keys are based upon a randomly-selected public key, there will be no repeating predictable data patterns. The keys may also be derived from other cryptographic keys.

Figure 4A:
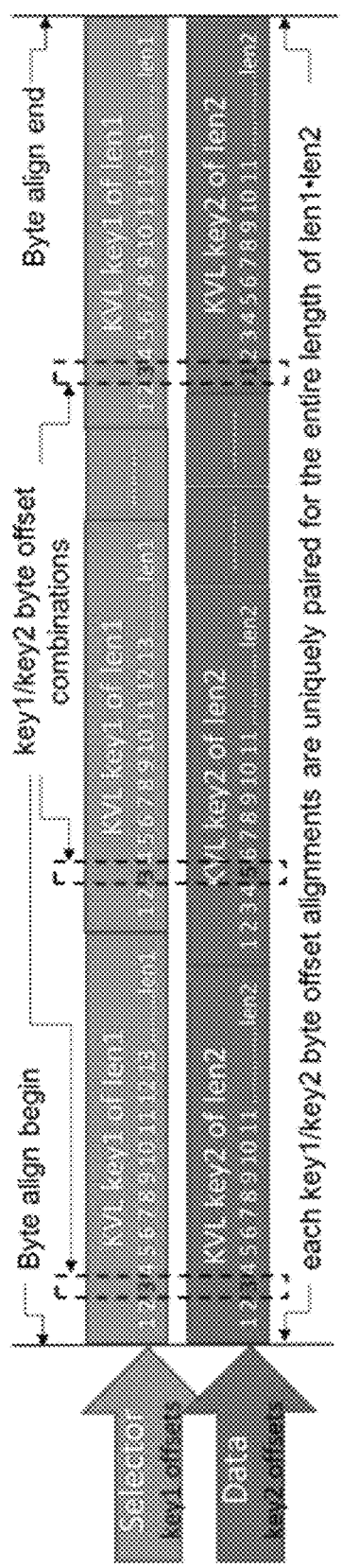
FIGS. 4A-4B are illustrations of steps in the generation of an extended length cryptographic key from two shorter keys.

As illustrated by FIG. 4A, a first private key (e.g., $K_1$) is chosen as a "selector" stream. The selector stream is formed by concatenating $K_1$ with itself for $L_2$ times, and will be denoted $S_1$. The creation of the selector $S_1$ is a function and may be expressed as $S_1=\text{concatenate}(K_1, L_2)$. Second, another private key is chosen (e.g., $K_2$) that is defined as the data stream. The data stream is formed by concatenating $K_2$ with itself for $L_1$ times and is denoted as $D_1$. The creation of the data stream is a function and may be expressed as $D_1=\text{concatenate}(K_2, L_1)$. Notice that both $S_1$ and $D_1$ have a length of $L_1 \times L_2$. Then, $S_1$ is byte-aligned with the $D_1$ from end to end.

For the selection of private key lengths, lengths $L_1$ and $L_2$ are typically selected to be prime numbers where $L_1 \neq L_2$. Thus, $\gcd(L_1, L_2)=1$ always holds true. If unique primes run out in the key length ranges, then non-prime lengths may be used as long as $\gcd(L_1, L_2)=1$. Based on mathematical number theory with the condition of $\gcd(L_1, L_2)=1$, then the relative byte offset in each $K_1$ and $K_2$ are uniquely paired such that no same offset pairs will repeat during the scope of the $S_1$ and $D_1$ byte alignments. This will result in a composite bit stream with no repeating data patterns due to repeated byte pairings from the respective $K_1$ and $K_2$.

Figure 4B:
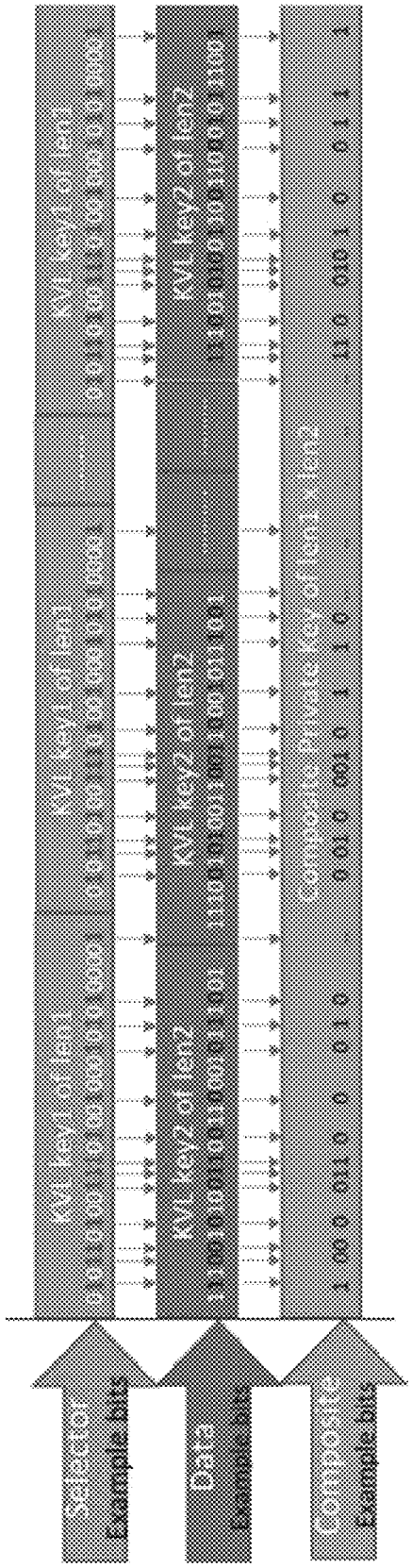

FIG. 4B illustrates formation of the composite key by indexing the aligned selector and data streams. The locations of individual selector bits that equal '1' form a mask that may be used to select corresponding bits from the data stream and where individual selector bits that equal 0 ignore bits from data stream. An alternate bit selection method may be implemented by forming N-bit groups of the selector and performing a mod 2 calculation where a '1' value selects the corresponding group of N-bit groups of the data, and a result of 0 ignores the data. This operation may be expressed as $C_1$=generateComposite($S_1$, $D_1$). The arguments are an ordered pair ($S_1$, $D_1$), and when they are reversed, this results in the generation of a completely different composite key by $C_2$=generateComposite($D_1$, $S_1$).

After the generation of $C_1$, then on average the composite key length will $L_1 \times L_2 \times 50\%$. The 50% comes from the usage of selector streams with a uniform random distribution of '1' values. Using two prime key lengths of 21,701 bytes and 21,683 bytes, then a single composite key length is on average 21,701×21,683×0.50 224.37 MB. These two example key lengths will be used for the remaining calculations in this text. The select modifiers uniquely extend the composite private keys, wherein each of the new composite key derivatives greatly expands the total composite key space. There are two distinct forms of select modifications: the permutation modifiers and the XOR modifiers. After the first composite private key $C_1$ is formed by $C_1$=generateComposite($S_1$, $D_1$), then the composite key space is uniquely extended by use of permutation and data manipulation functions against every byte in the original $S_1$ which forms the new derivative selector $S_2$. The result is $C_2$=generateComposite($S_2$, $D_1$). As many unique derivatives $S_N$ are created, then the result is a corresponding number of unique $C_N$ derivatives. The original data stream, $D_1$, is never changed for the initial pair of selector and data, ($S_1$, $D_1$).

Additional composite keys may be created by permuting values of the selector stream. A set of permutation operations may be defined and a system may store (or receive) instructions that determine which permutations to apply, in which order such that two communicating parties can independently generate the same additional selectors and thus generate identical sets of additional composite keys. We denote fundamental permutations by $p_k$ where k≥0. $p_0$ (also referred to as the pass-through) is defined as $p_0$[12345678]= 12345678. For example, $p_0$[0b11110000]=0b11110000. $p_1$ (also referred to as the even-odd bit swap) is defined by $p_1$[12345678]=21436587. For example, $p_1$[0b10101010]= 0b01010101. $p_2$ is defined as $p_2$[12345678]=34127856. For example, $p_2$[0b00111100]=0b11000011.

Bit-rotate permutations are functions are denoted as $b_k$ where k>0 and #<8. $b_0$ (also referred to as the bit-rotate pass-through) is defined by $b_0$[12345678]=12345678. For example, $b_0$[0b10110010]=0b10110010. $b_1$[12345678]= 23456781. For example, $b_1$(0b10110010)=0b01100101. $b_2$[12345678]=34567812. For example, $b_2$[0b10110010]= 0b11001010. For the base and bit-rotate permutations, these are classified as permutation function maps 1-byte (8-bits) →1-byte (8-bits). Mathematically, there are P(8,8)= 8!/(8-8)!=40,320 different possible permutations. Thus far, there are chosen 50 different base permutations and for each there are 8 bit-rotate permutations. This results in a selection of 50×8=400 different byte permutations. In order to detect and remove any duplicate pe1 mutations, a program is used to verify permutation uniqueness for each base permutation and enumerate each bit rotate into a complete list. All of these 400 permutations are unique.

Additional permutation functions make use of the XOR function. Distinct from the permutation building blocks are a completely different class of functions for changing the selector bytes referred to as the XOR manipulation functions. In this class of manipulator functions, there are no permutations and consist of only individual bit changes. XOR functions are manipulation functions, denoted as $x_k$ where k≥0. The XOR function is denoted by the ^ bit operator. Consider $x_0$ (also referred to as the pass-through). Defined as $x_0$(bits)=bits ^ 0b00000000. For example, $x_0$[0b11110000]=0b11110000^ 0b00000000=0b00001111. Consider $x_1$. Defined as $x_1$ [bits]=bits ^0b11111111. For example, $x_1$[0b11110000)=0b11110000 ^0b11111111=0b00001111. Consider $x_2$. Defined as $x_2$[bits]= bits ^0b11011101. For example, $x_2$[0b11110000]= 0b11110000 ^0b11011101=0b00101101. For the XOR byte manipulation function, there are 28=256 different possibilities. So far, there are 128 XOR manipulation functions chosen for use in composite key generation. When the permutation and XOR manipulations are combined together, then this results in 50×8×128=51,200 different selector byte manipulations.

The set of basic permutation functions {p, b} may be combined with XOR-based manipulations. In this language, the initial formation of the first composite key is based upon a pass-through selector formed by selByte=$b_0$[$p_0$[$x_0$ [selByte] ] ] for every byte in the selector. Then, the composite key generation process continues in a very ordered manor, as shown in FIG. 5, with very specific selector manipulation sequences for each byte in the base selector stream. As each new $S_1$ to $C_1$ key is created, the final composite key correspondingly grows by concatenate($C_0$, $C_1$, . . . , $C_N$). Now the maximum composite key space length is up to 224.37 MB •51,200≈10.96 TB for a single private key pair (e.g., $K_1$, $K_2$).

Thus far, these permutation functions map are 1-byte (8-bits) at the input→1-byte (8-bits) at the output. However, the permutation mappings may be extended to include other input output mappings, like using adjacent bytes as inputs. Using a combination of the current byte and previous bytes, example mappings include: 2-byte (16-bits)→1-byte (8-bits) permutations. For example, where the previous byte bit positions 'abcdefgh' and the current byte bit positions '12345678', then a new byte of 'b2d4f6h8' can be formed. The number of possible permutations is P(16,8)=16!/(16-8) !≈5.1×10$^8$. 3-byte (24-bits)→1-byte (8-bits) mappings yield P(24,8)=24!/(24-8)!≈2.9×10$^{10}$ permutations. 4-byte (32-bits)→1-byte (8-bits) mappings yield P(32,8)=32!/(32-8) !≈4.2×10$^{11}$ possible permutations. As the number of base permutations is increased from 50 to, for example, 1024, the composite key space expands substantially from 50×8× 128=51,200 different selector byte manipulations to 1024× 8×128=1,048,576, a twenty-fold increase. Hence, there is essentially no limit to the number of possible permutations.

Thus far, we have the discussed composite private keys based on a single ordered key pair such as $C_1$=generateComposite($S_1$, $D_1$), where $S_1$=concatenateX ($K_1$, $L_2$) and $D_1$=concatenateX($K_2$, $L_1$). If the assignments are reversed between the $K_1$ and $K_2$, then $C_2$=generateComposite(selector2, data2) where select2=concatenateX($K_2$, $L_1$) and $D_2$=concatenateX($K_1$, $L_2$). Since the selector/data roles are reversed, then this results in unique $C_1$ and $C_2$ keys. Thus, the composite key length can be doubled by generating both concatenate($C_1$, $C_2$). This results in 2×10.96 TB≈21.92 TB of total composite key space using just two unique $K_1$ and $K_2$ values. As N number of unique keys are added with gcd(len-i, len-j)=1 for all keys where len-i≠len-j, then there will be (N)×(N−1) unique ordered key pairs. As shown in FIG. 6, there is an acceleration of the resultant composite key space.

Initially, in any given encryption or decryption session, each of the public keys must be defined upfront. The number of public keys is set depending upon the desired total composite private key space and/or the amount of parallel ordered key pair generation worker threads, as discussed in more detail below.

The storage and communication of the public keys is largely dependent upon the use case. In the case of encryption/decryption applications, the two systems (i.e., the sender and receiver) may each have separately secured identical cryptographic tables and passwords, and they communicate an initial set of public keys and the encrypted file. The initial key exchange will be referenced as 'KeySet$_1$'. As the encryption and decryption is writing or reading the encrypted stream, the XOR encrypted data will be organized in logical "data blocks." The size of the data blocks is implementation dependent. One possible implementation is to arrange the data blocks around the indices of the $b_N[p_N[x_N[selByte]]]$ calls that were described previously. The significance of these data blocks is that they will be used during the key extension process.

Figure 6A:
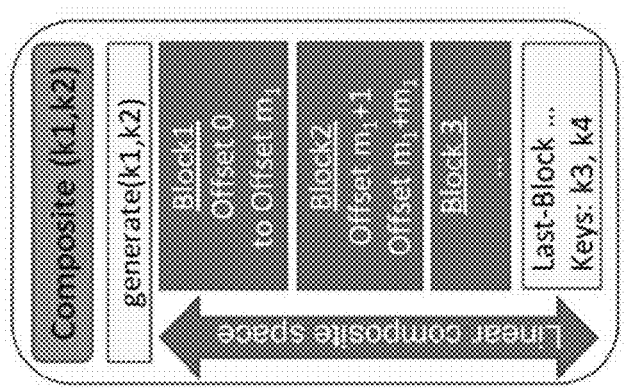
FIGS. 6A-6B illustrate extension of a set of composite keys and multiple such extensions as may be generated in multi-threaded computing system.

It is anticipated to use the composite private key space to encrypt very large amounts of data. Therefore, at some point, the last of the composite private key space may run out for the continuing XOR encryption process. At that point, new public and private key pairs (labeled as KeySet$_N$') have to be generated. If the encryption session begins with a KeySet$_1$ exchange of N-keys, then each key extension must also include N keys. To exchange the new key extension KeySet$_N$, then the associated public keys required to generate KeySet$_N$ will be embedded as part of the encrypted data payload, at the beginning of the last encrypted "data block" (FIG. 6A). The data block size must be large enough to contain all of the public keys of KeySet$_N$. Both the size of the data block and the exact position of the key extension KeySet$_N$ is implementation dependent.

Figure 6B:
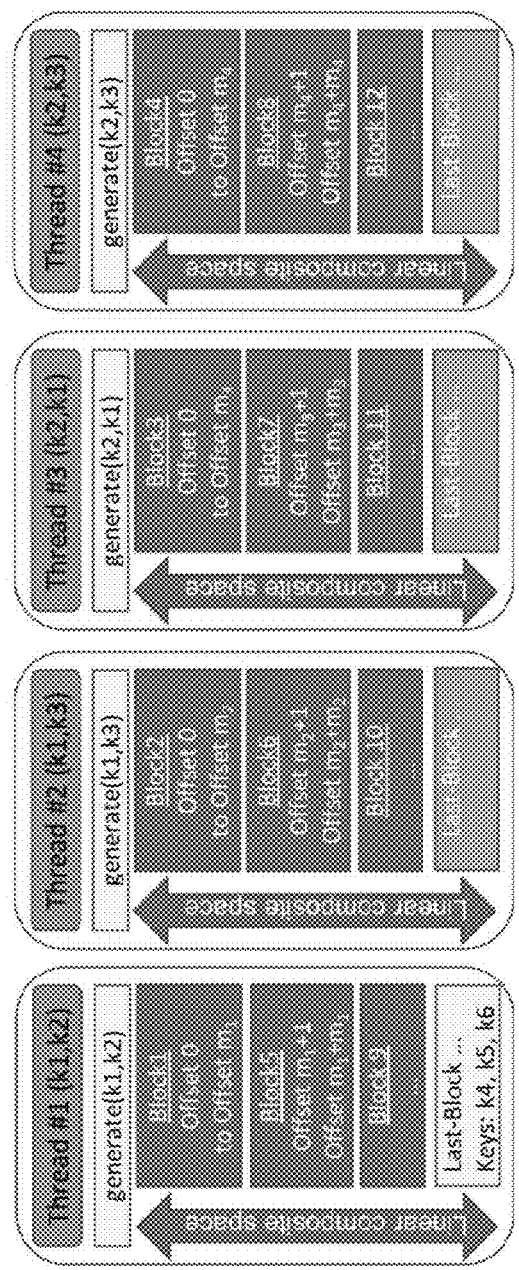

A creative way of generating the key space faster is to implement a threading algorithm that generates the composite key space in parallel. One such innovative threading algorithm is to organize the processing of ordered key pairs into separate threads. FIG. 6B shows an example, where there are 3 unique keys $K_1$, $K_2$, and k3 and several ordered key pair threads are formed. Each of the worker threads above create blocks of unique key space that are created in parallel. Then a key consumer thread is defined (not shown) that is either performing encryption or decryption. The key consumer thread absorbs the blocks of unique key space in block sequential order. This allows the overall rate of encryption/decryption to run many times faster.

FIG. 7 summarizes the available composite key space as additional keys are generated as described above for an example where the first selector and the first datastream each have a length of 448.7 MB, (their respective lengths being 21,701 and 21,683). Two 224.3 MB composite keys may be generated. These two keys may be concatenated to form a composite key space of 448.7 MB. Along these lines, FIG. 7 shows the key spaces achieved with various schemes disclosed herein enabling larger and larger composite key spaces.

We now formally prove that non-repeating byte alignments are generated by methods disclosed above. We begins with two private keys, $K_1$ and $K_2$, with respective lengths of $L_1$ and $L_2$, where $L_1 \neq L_2$ and $\gcd(L_1, L_2)=1$. The keys $K_1$ and $K_2$ will be byte indexed using respective integer offsets $r_1$ and $r_2$, where $0 \leq r_1 < q_1$ and $0 \leq r_2 < q_2$. We form $S_1$ by concatenating $K_1$ with itself $p_2$ times, so that the length of $S_1$ is a total of $q_1 \times q_2$ bytes. We form $D_1$ by concatenating $K_2$ with itself $q_1$ times, so that the data stream $D_1$ has a total length of $q_1 \times q_2$ bytes. The streams $S_1$ and $D_1$ are aligned such that they are both indexed by the integer i offset, where $0 \leq i < q_1 \times q_2$.

Claim: Since the streams $S_1$ and $D_1$ are byte indexed by i, there exists unique byte index pairs $r_1$ and $r_2$ within the associated streams $K_1$ and $K_2$ for the entire indexed length of $0 \leq i < q_1 \cdot q_2$.

Proof: By the Division Algorithm, there exists unique integers m and $r_1$ such that $i = m \cdot q_1 + r_1$, where $0 \leq r_1 < q_1$ and $0 \leq i < q_1 \times q_2$ and, there exists unique integers n and $r_2$ such that $i = n \times q_2 + r_2$, where $0 \leq r2 < q_2$ and $0 \leq i < q_1 \times q_2$. It follows that $r_1 = i \bmod q_1$ and $r_2 = i \bmod p_2$. Then by definition of congruence, $r1 = i \bmod q_1 \leftrightarrow i = r_1 \bmod q_1$ and $r2 = i \bmod q_2 \leftrightarrow i = r_2 \bmod q_2$. Since $\gcd(q_1, q_2) = 1$ and by the Chinese Remainder Theorem, then there exists unique integers $r_1$ and $r_2$ for any integer i, modulo $q_1 \times q_2$. The overall significance of this claim is that the composite bytes generated from the streams $S_1$ and $D_1$ will not have duplicate composite bytes due to duplicate byte offset pairs from their respective source streams.

In an embodiment, a method includes receiving an initial instruction from a remote computing device using a client computing device having an addressable cryptographic table, retrieving first and second bitstreams having different lengths from the addressable cryptographic table by deriving addresses in the addressable cryptographic table from the initial instruction, accessing first and second bit values stored at addresses belonging to the derived addresses in the addressable cryptographic table, outputting the first bit values as the first bitstream and the second bit values as the second bitstream, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

In an embodiment, the method includes determining, as the different lengths of the first and second bitstream, two co-prime integers, and selecting a product of the different lengths as the desired length. In an embodiment, the method includes selecting a permutation instruction from a set of allowed permutation instructions defined in memory of the computing device, applying one or more permutation instructions or logical operations to the selector stream to produce additional selector streams, and forming additional composite encryption keys by selecting values of the data stream identified by corresponding values of respective additional selector strings. In an embodiment, applying the one or more permutation instructions or logical operations includes applying a unique permutation function that uniquely reorders values of the selector stream to produce each additional selector stream. In an embodiment, retrieving the first and second bitstreams from the addressable cryptographic table comprises measuring physical characteristics of physical unclonable function ("PUF") devices of a PUF array of the computing device at addresses in the PUF array derived from the initial instruction. In an embodiment, measuring the physical characteristics of the PUF devices of the PUF array comprises repeatedly measuring each PUF device and returning values for each PUF device based on statistical characteristics of the repeated measurements of that PUF device. In an embodiment, the method includes encoding into the first composite encryption key an error correction code, and executing an error correction method on the first composite encryption key using parity bits, data helpers, response based cryptographic methods, ternary cryptography, and fuzzy extractors.

In an embodiment, a device includes a processor and a memory coupled to the processor. The memory stores instructions that, when executed by the processor, cause the processor to perform the steps of receiving an initial instruction from a remote computing device using a client computing device having an addressable cryptographic table, retrieving first and second bitstreams having different lengths from the addressable cryptographic table by deriving addresses in the addressable cryptographic table from the initial instruction, accessing first and second bit values stored at addresses belonging to the derived addresses in the addressable cryptographic table, outputting the first bit values as the first bitstream and the second bit values as the second bitstream, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

In an embodiment, a device includes a processor and a memory coupled to the processor. The memory stores instructions that, when executed by the processor, cause the processor to perform the steps of receiving an initial instruction from a remote computing device, retrieving first and second bitstreams having different lengths from an addressable cryptographic table by determining first and second bit values stored at addresses belonging to addresses derived from the initial instruction in the addressable cryptographic table, concatenating the first bitstream with data from the first bitstream to form a data stream having a desired length, concatenating the second bitstream with data from the second bitstream to form a selector stream having the desired length, and forming a first composite encryption key having a length longer than a length of the first bitstream and the second bitstream by selecting values of the data stream identified by corresponding bit values of the selector stream.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

The invention claimed is:

1. A method, comprising:
receiving an initial instruction from a remote computing device using a client computing device, the client computing device having an addressable cryptographic table;
retrieving first and second bitstreams having different lengths from the addressable cryptographic table by:
deriving addresses in the addressable cryptographic table from the initial instruction;
accessing first bit values and second bit values stored at addresses belonging to the derived addresses in the addressable cryptographic table; and
outputting the first bit values as the first bitstream and the second bit values as the second bitstream;
concatenating the first bitstream with data from the first bitstream to form a data stream having a desired length;
concatenating the second bitstream with data from the second bitstream to form a selector stream having the desired length; and
forming a first composite encryption key having a length longer than a length of the first bitstream and longer than a length of the second bitstream by selecting values of the data stream identified by corresponding bit values of the selector stream
wherein the addressable cryptographic table includes an array of physical unclonable function ("PUF") devices.

2. The method of claim 1, further comprising:
determining, as the different lengths of the first and second bitstream, two co-prime integers; and
selecting a product of the different lengths as the desired length.

3. The method of claim 1, further comprising:
selecting a permutation instruction from a set of allowed permutation instructions defined in memory of the computing device,
applying one or more permutation instructions or logical operations to the selector stream to produce additional selector streams; and
forming additional composite encryption keys by selecting values of the data stream identified by corresponding values of respective additional selector strings.

4. The method of claim 3, wherein the applying the one or more permutation instructions or logical operations comprises:
applying a unique permutation function that uniquely reorders values of the selector stream to produce each additional selector stream.

5. The method of claim 1, wherein the retrieving the first and second bitstreams from the addressable cryptographic table comprises:
measuring physical characteristics of PUF devices of the array of PUF devices of the computing device at addresses in the array of PUF devices derived from the initial instruction.

6. The method of claim 5, wherein the measuring the physical characteristics of the PUF devices of the array of PUF devices comprises repeatedly measuring each PUF device and returning values for each measured PUF device based on statistical characteristics of repeated measurements of each measured PUF device.

7. The method of claim 1, further comprising:
encoding into the first composite encryption key an error correction code; and
executing an error correction method on the first composite encryption key using parity bits, data helpers, response based cryptographic methods, ternary cryptography, and fuzzy extractors.

8. A device, comprising:
a processor; and
a memory coupled to the processor, the memory storing instructions that, when executed by the processor, cause the processor to perform the steps of:
receiving an initial instruction from a remote computing device using a client computing device having an addressable cryptographic table;
retrieving first and second bitstreams having different lengths from the addressable cryptographic table by:
deriving addresses in the addressable cryptographic table from the initial instruction;
accessing first bit values and second bit values stored at addresses belonging to the derived addresses in the addressable cryptographic table;
outputting the first bit values as the first bitstream and the second bit values as the second bitstream;
concatenating the first bitstream with data from the first bitstream to form a data stream having a desired length;
concatenating the second bitstream with data from the second bitstream to form a selector stream having the desired length; and
forming a first composite encryption key having a length longer than a length of the first bitstream and longer than a length of the second bitstream by selecting values of the data stream identified by corresponding bit values of the selector stream wherein, the addressable cryptographic table includes an array of physical unclonable function ("PUF") devices.

9. The system of claim 8, wherein the memory includes instructions that, when executed by the processor cause the processor to perform the steps of:
determining, as the different lengths of the first and second bitstream, two co-prime integers; and
selecting a product of the different lengths as the desired length.

10. The system of claim 8, wherein the memory includes instructions that, when executed by the processor cause the processor to perform the steps of:
selecting a permutation instruction from a set of allowed permutation instructions defined in memory of the computing device,
applying one or more permutation instructions or logical operations to the selector stream to produce additional selector streams; and
forming additional composite encryption keys by selecting values of the data stream identified by corresponding values of respective additional selector strings.

11. The system of claim 10, wherein the applying the one or more permutation instructions or logical operations comprises:
applying a unique permutation function that uniquely reorders values of the selector stream to produce each additional selector stream.

12. The system of claim 8, wherein the retrieving the first and second bitstreams from the addressable cryptographic table comprises:
measuring physical characteristics of PUF devices of the array of PUF devices of the computing device at addresses in the array of PUF devices derived from the initial instruction.

13. The system of claim 12, wherein the measuring the physical characteristics of the PUF devices of the array of PUF devices comprises repeatedly measuring each PUF device and returning values for each measured PUF device based on statistical characteristics of repeated measurements of each measured PUF device.

14. The system of claim 8, wherein the memory includes instructions that, when executed by the processor cause the processor to perform the step of encoding into the first composite encryption key an error correction code.

15. The system of claim 8, wherein the memory includes instructions that, when executed by the processor cause the processor to perform the step of executing an error correction method on the first composite encryption key using parity bits, data helpers, response based cryptographic methods, ternary cryptography, and fuzzy extractors.

16. A device, comprising:
a processor; and
a memory coupled to the processor, the memory storing instructions that, when executed by the processor, cause the processor to perform the steps of:
receiving an initial instruction from a remote computing device;
retrieving first and second bitstreams having different lengths from an addressable cryptographic table by determining first bit values and second bit values stored at addresses belonging to addresses derived from the initial instruction in the addressable cryptographic table;
concatenating the first bitstream with data from the first bitstream to form a data stream having a desired length;
concatenating the second bitstream with data from the second bitstream to form a selector stream having the desired length; and
forming a first composite encryption key having a length longer than a length of the first bitstream and longer than a length of the second bitstream by selecting values of the data stream identified by corresponding bit values of the selector stream
wherein the addressable cryptographic table includes an array of physical unclonable function ("PUF") devices.

17. The system of claim 16, wherein the memory includes instructions that, when executed by the processor cause the processor to perform the steps of:
determining, as the different lengths of the first and second bitstream, two co-prime integers; and
selecting a product of the different lengths as the desired length.

18. The system of claim 16, wherein the memory includes instructions that, when executed by the processor cause the processor to perform the steps of:
selecting a permutation instruction from a set of allowed permutation instructions defined in memory of the computing device,
applying one or more permutation instructions or logical operations to the selector stream to produce additional selector streams; and
forming additional composite encryption keys by selecting values of the data stream identified by corresponding values of respective additional selector strings.

19. The system of claim 18, wherein the applying the one or more permutation instructions or logical operations comprises:
applying a unique permutation function that uniquely reorders values of the selector stream to produce each additional selector stream.

20. The system of claim 16, wherein the retrieving the first and second bitstreams from the addressable cryptographic table comprises:
    measuring physical characteristics of PUF devices of the array of PUF devices of the computing device at addresses in the array of PUF devices derived from the initial instruction.

* * * * *